(12) United States Patent
Waters et al.

(10) Patent No.: US 12,466,481 B2
(45) Date of Patent: Nov. 11, 2025

(54) CONTROL LEVER CALIBRATION SYSTEM

(71) Applicant: DEERE & COMPANY, Moline, IL (US)

(72) Inventors: Alexander K. Waters, Apex, NC (US); Sujith Vijaya Kumar, Cary, NC (US)

(73) Assignee: Deere & Company, Moline, IL (US)

( * ) Notice: Subject to any disclaimer, the term of this patent is extended or adjusted under 35 U.S.C. 154(b) by 475 days.

(21) Appl. No.: 18/069,243

(22) Filed: Dec. 21, 2022

(65) Prior Publication Data
US 2024/0210217 A1    Jun. 27, 2024

(51) Int. Cl.
*B62D 11/00*     (2006.01)
*A01D 34/00*     (2006.01)
*A01D 34/82*     (2006.01)
*B62D 11/02*     (2006.01)

(52) U.S. Cl.
CPC .......... *B62D 11/003* (2013.01); *A01D 34/006* (2013.01); *B62D 11/02* (2013.01); *A01D 34/824* (2013.01)

(58) Field of Classification Search
CPC ....... B62D 11/003; B62D 11/02; B62D 11/06; A01D 34/006; A01D 34/824; G05G 1/04
See application file for complete search history.

(56) References Cited

U.S. PATENT DOCUMENTS

| | | | |
|---|---|---|---|
| 5,012,415 A * | 4/1991 | Boe .................. | A01B 63/112 172/3 |
| 5,918,195 A * | 6/1999 | Halgrimson .......... | A01B 63/00 700/71 |
| 7,669,580 B2 * | 3/2010 | Silbernagel ............ | A01D 34/64 123/319 |
| 9,510,503 B2 | 12/2016 | Elhardt et al. | |
| 10,058,031 B1 | 8/2018 | Brown et al. | |
| 10,440,880 B2 | 10/2019 | Wyatt et al. | |
| 10,882,021 B2 | 1/2021 | Buchanan et al. | |
| 2007/0250222 A1 | 10/2007 | Okuyama et al. | |
| 2008/0228336 A1 | 9/2008 | Spranger | |
| 2022/0153344 A1 | 5/2022 | Steinert | |
| 2023/0309443 A1 * | 10/2023 | Xu ...................... | A01D 34/006 |

OTHER PUBLICATIONS

Great Britain Combined Search and Examination Report issued in application No. GB2317089.7 dated May 8, 2024, 05 pages.

* cited by examiner

*Primary Examiner* — Huan Le

(57) ABSTRACT

A control lever calibration system includes translating position signals of a control lever to traction drive motor commands for a work vehicle, determining if the position signals are within a stored range of control lever position signals, and expanding the stored range if position signals are outside the stored range.

10 Claims, 6 Drawing Sheets

CONTROL LEVER CALIBRATION SYSTEM

FIELD OF THE INVENTION

This invention relates to work vehicles such as zero turning radius ("ZTR") mowers with control levers having electronic sensors that provide signals to traction drive motors.

BACKGROUND OF THE INVENTION

Work vehicles may have one or more electronic sensors to detect the position of control levers used by the operator. Signals from each sensor may be translated or mapped to commands to traction drive motors for the vehicle. For example, zero turning radius ("ZTR") mowers have control levers to control the speed of rear traction drive motors for differential steering. Electronic sensors may be used to detect the angular position of each of a pair of control levers. The signals may be translated or mapped to commands to a pair of traction drive motors. ZTR mowers also may have a neutral switch that detects a control lever in the neutral position and may engage a park brake. Similarly, lawn tractors may have a pair of control levers which are foot pedals to control the speed and direction of the vehicle. Electronic sensors may detect the position of each pedal, and translate or map the sensor signals to traction drive motors.

Each of the control levers may have slightly different neutral positions, and also may have a range that may drift over time. As a result, signals from electronic sensors may not match the physical position of each control lever, and may not always translate or map to desired traction drive motor commands.

In the past, physical methods such as mechanical stops were used to place each control lever in the neutral position, and to keep each control lever from drifting outside range limits over time. There is a need for a control lever calibration system that can automatically update both the neutral position and range limits of control levers for traction drive motors, and that allows for sensor drift in either direction over time.

SUMMARY OF THE INVENTION

A control lever calibration system includes an electronic sensor that provides position signals. The position signals are mapped or translated to commands to a traction drive motor. A controller saves position signals for the control lever when a neutral switch is activated, and when the position signals indicate the control lever range is greater than the previously stored range.

DESCRIPTION OF THE PREFERRED EMBODIMENT

Figure 1:
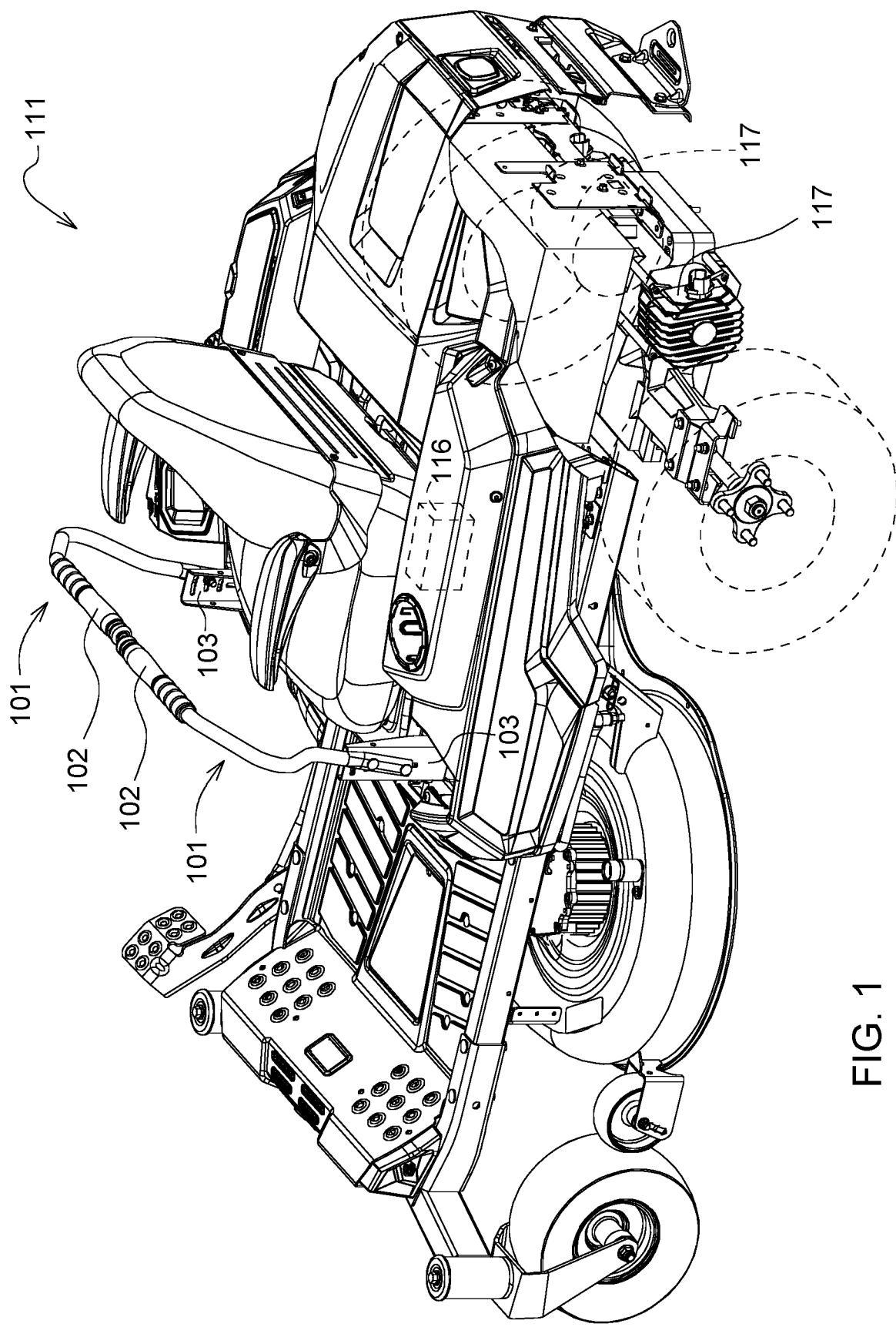
FIG. 1 is a perspective view of a ZTR mower with a control lever calibration system according to a first embodiment of the invention.

Control lever calibration system 100 may be provided on a work vehicle having one or more control levers 101. For example, FIG. 1 shows ZTR mower 111 having a pair of control levers 101 to provide differential steering. Each control lever 101 may include handle 102 attached to steering bracket 103. Each control lever may be pivotably mounted to base 104 on a frame member adjacent an operator platform. Each control lever may be pivoted forward or rearward to steer the work vehicle by controlling the rotational speed of a traction drive motor 117. Control levers on a ZTR mower are described in U.S. Pat. No. 9,510,503 for Grass Mowing Machine Operator Platform owned by Deere & Company.

Control lever calibration system 100 also may be provided on other work vehicles such as lawn tractors, riding mowers, off road utility vehicles and small tractors. For example, the control lever calibration system may be used with various different control levers such as foot pedals. Electronic sensors may be used to detect the position of the control levers, and sensor signals may be translated or mapped to provide commands to one or more traction drive motors on the work vehicle. The control levers may be moveable between a first end and a second end of a range, and may have a neutral position between the first and second ends.

Figure 2:
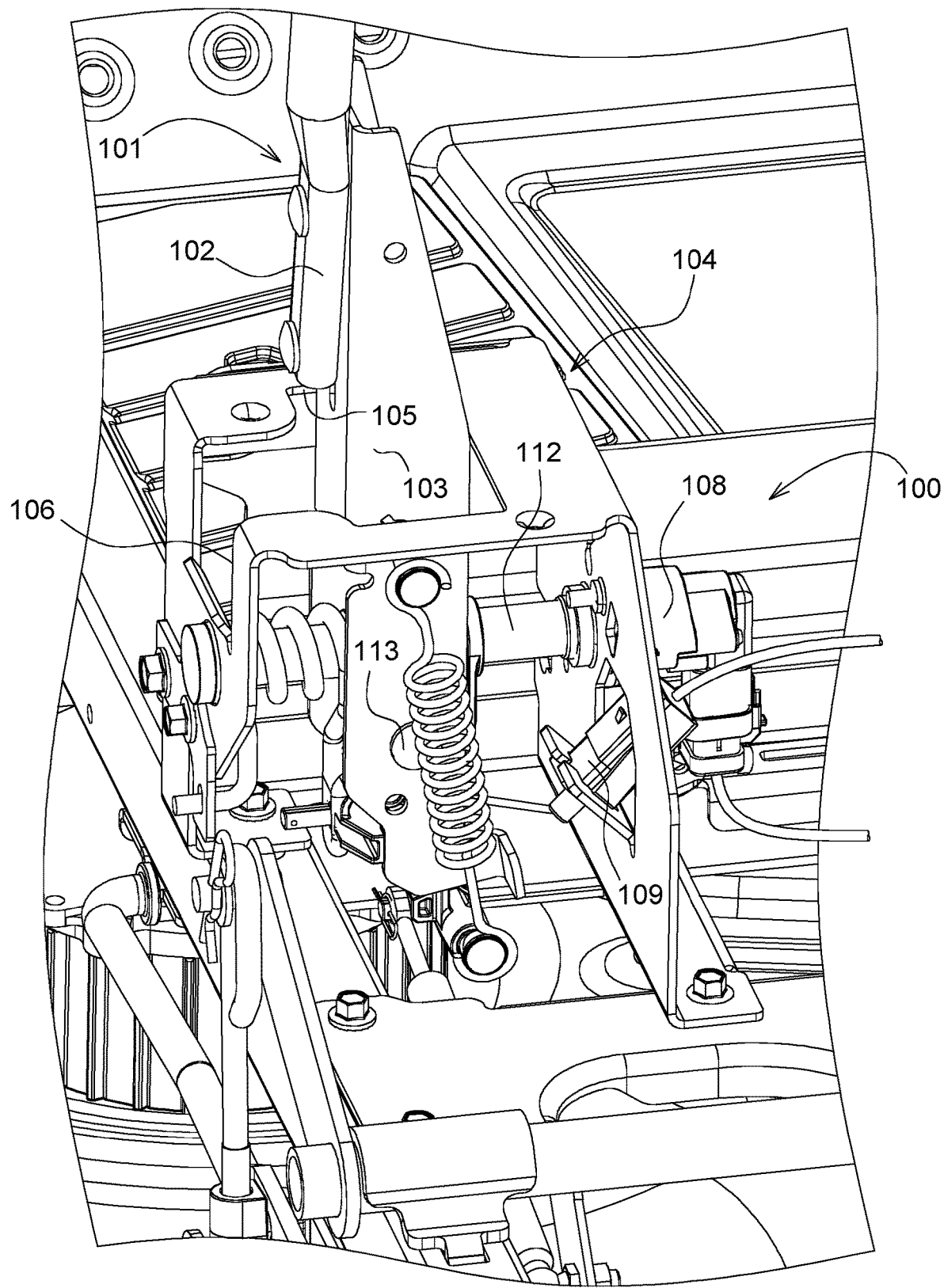
FIG. 2 is a perspective view of a control lever calibration system with a control lever in a neutral position according to a first embodiment of the invention.
Figure 3:
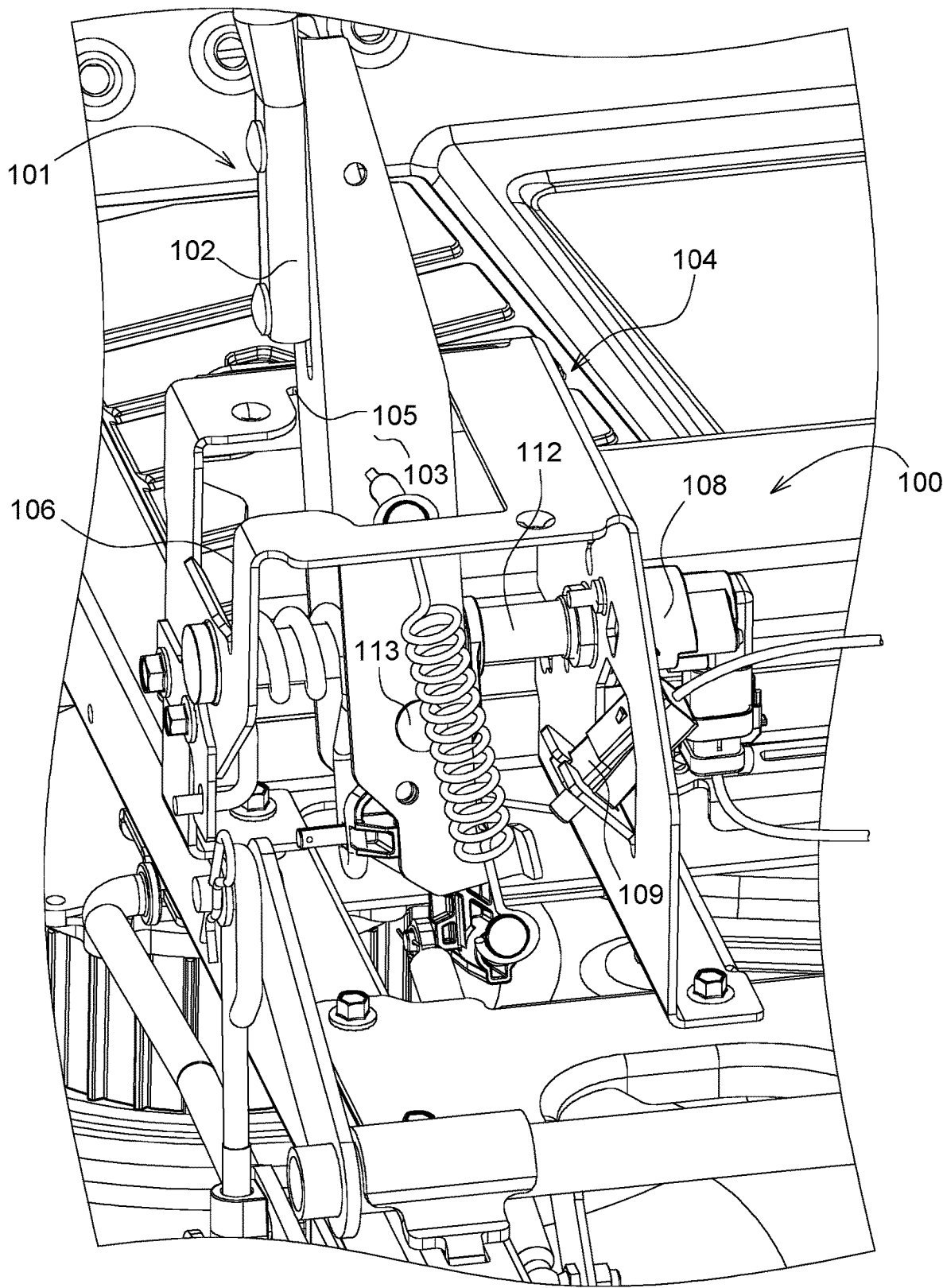
FIG. 3 is a perspective view of a control lever calibration system with a control lever in a full forward position according to a first embodiment of the invention

In a first embodiment shown in FIGS. 1-4, it will be understood that the same or essentially the control lever calibration system 100 may be provided for each of a pair of control levers 101. FIG. 2 shows control lever 101 in a neutral position, but is not actuating neutral switch 109. FIG. 3 shows control lever 101 pivoted to a first end or forward limit of a range. For example, the first end or forward limit of the range may be a maximum angle of about 20 degrees from the neutral position. The control lever also may be pivoted in the opposite direction to a second end or rearward limit of the range. For example, the second end may be a maximum angle of about 10 degrees from the neutral position. The control lever may travel in slot 105 when pivoting between the first and second ends of the range. Electronic rotary sensor 108 may sense the angular position of the control lever anywhere between the first and second ends of the range, and may provide position signals that may be translated or mapped to commands for a traction drive motor 117 on the vehicle.

Figure 4:
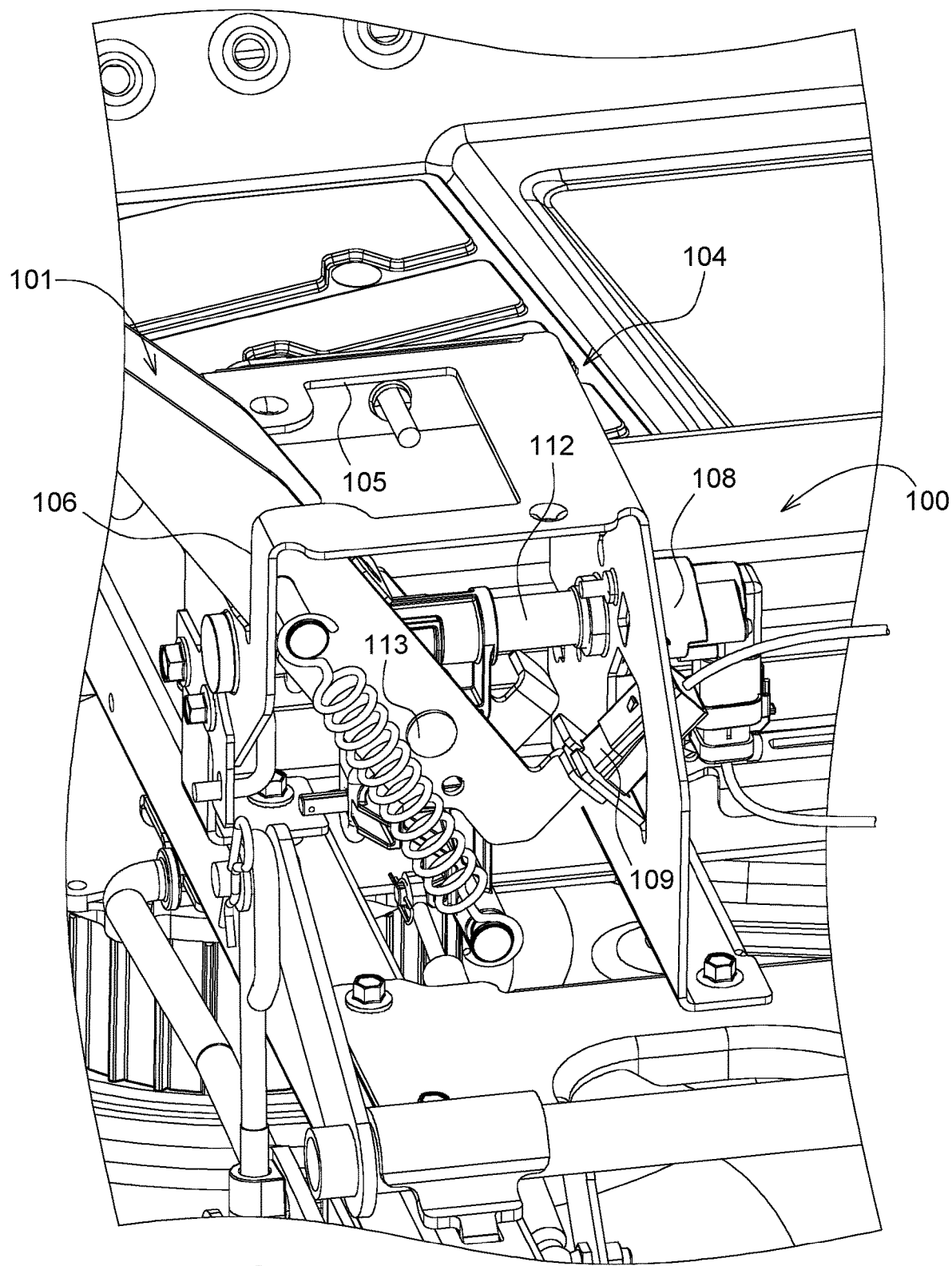
FIG. 4 is a perspective view of a control lever calibration system with a control lever activating a neutral switch according to a first embodiment of the invention.

In one embodiment, control lever calibration system 100 may include control lever 101 having a second or inward/outward steering pivot axis 113 which enables the control lever to pivot laterally from an inward to an outward position. The second or inward/outward pivot axis 113 may be located below and perpendicular to the forward/reverse pivot axis 112. As shown in FIG. 4, the control lever may pivot laterally outward to a maximum angle of about 36 degrees. The control lever may pivot within slot 106 having stops at the full inward and full outward positions. When the control lever reaches the full outward position, it may contact and actuate neutral switch 109. When actuated, neutral switch 109 also may engage a park brake for the work vehicle.

Figure 5:
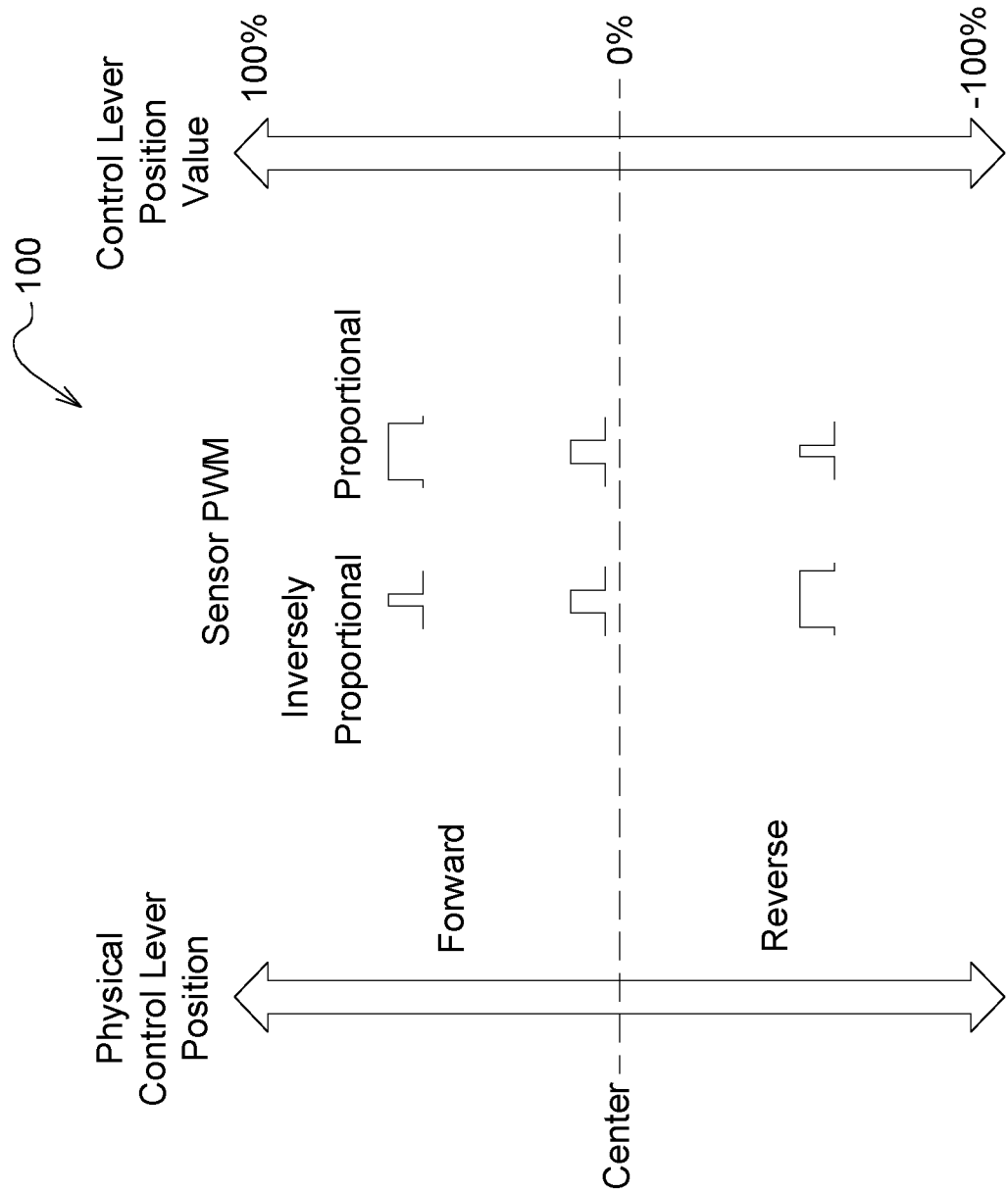
FIG. 5 is a diagram of a control lever calibration system in which the physical position of a control lever may be translated or mapped to a position value according to a first embodiment of the invention.

In one embodiment, control lever calibration system 100 may translate or map signals from each electronic sensor to position values for traction drive motor commands. The control lever may pivot between a first end and second end of a range on pivot axis 112. Rotary sensor 108 may be configured to provide PWM signals of 0% to 100% to controller 116 based on the physical position or angle of the control lever. Alternatively, the sensor may provide analog or digital signals based on the control lever position. The signals from sensor 108 may be translated or mapped to a position value of −100% to +100% which may be used to provide traction drive motor commands. In the case of a ZTR mower, the commands may be to one or a pair of traction drive motors 117. For example, FIG. 5 is a linear diagram showing the range of raw PWM input signals from sensor 108 indicating the physical position of a control lever. The raw PWM input signals may be in a range between 0% and 100% PWM duty cycle. The controller may translate or map the PWM input signals to position values of −100% to +100% for commanding a traction drive motor 117. The position values may be proportional or inversely proportional to the raw PWM input signals.

In one embodiment, control lever calibration system 100 may include the step of reading electronic sensor 108 to capture the neutral position of the control lever each time the work vehicle is turned on and/or powered up. Before capturing the neutral position, the controller may check for sensor faults, and check if the control lever has actuated neutral switch 109, as shown in FIG. 4. For example, the controller may require the control lever to actuate neutral switch 109 for at least a specified time in milliseconds. The controller then may capture the PWM position signal of the electronic sensor 108 for the control lever, and save the signal in memory. The neutral position signal from sensor 108 may be translated or mapped to a neutral traction drive motor position. The controller may save the neutral position signal only for the specific power cycle, and recapture the neutral position signal again on each start up of the work vehicle.

Alternatively, to capture the neutral position of a control lever such as a pedal, the system may start with a preset band where sensor readings are expected if the pedal is not depressed. The system may monitor the sensor readings to determine if successive position sensor readings are within this band. The system may capture the midpoint of the sensor readings within the band and store this in memory as the neutral position. In subsequent runs, the system may check sensor readings from the pedal within a narrower band when the pedal is not depressed. For each run, the system may capture the position as the neutral point. As a result, the system may allow the neutral point to drift over time.

Figure 6:
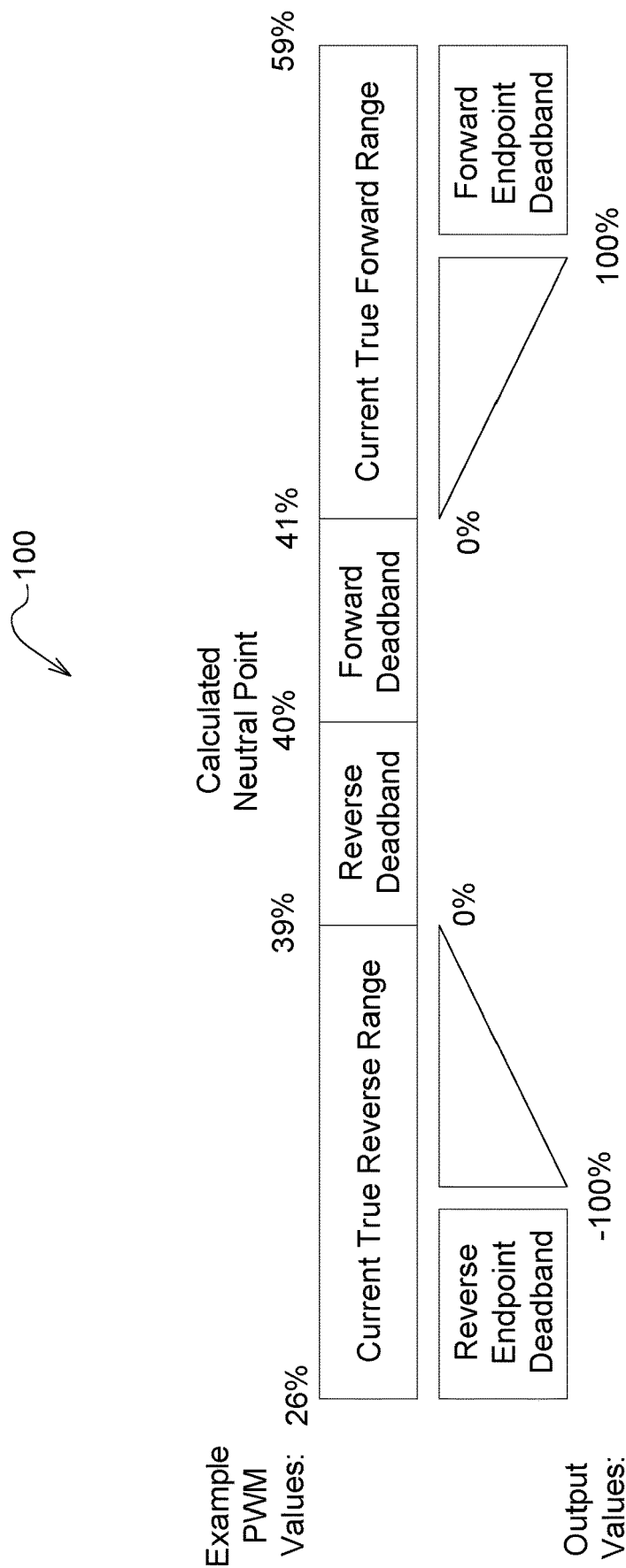
FIG. 6 is a diagram of a control lever calibration system having a range of position values of the control lever according to a first embodiment of the invention.

In one embodiment, the control lever calibration system may include the step of setting a deadband on each side of the neutral control lever position. For example, as shown in FIG. 6, if the neutral position is 40%, the controller may set a reverse deadband down to 39%, and a forward deadband up to 41%. When the sensor signal indicates the control lever is in the deadband on either side of neutral, the signal from sensor 108 may be translated or mapped to a neutral traction drive motor command.

In one embodiment, control lever calibration system 100 may include the step of updating the first end and second end range limits for each control lever during operation of the work vehicle. Updating the range limits allows sensor drift in either direction over time. For example, the controller may update the range limits each time sensor 108 signals a control lever is located at a new maximum position at either end of the range, which exceeds the default maximum position set at the factory or the maximum previously stored in memory. The controller may read the new maximum range limit from sensor 108 and translate or map it to traction drive motor commands during current operation of the vehicle.

In one embodiment, the control lever calibration system may include the step of reducing the new maximum range limits and then storing the reduced value in memory at vehicle shut down. The amount of reduction, or storage offset, may be a percentage of the new maximum range excluding the neutral deadband. On the next power up, the controller may recall and use the stored maximum values that have been reduced with the storage offset.

Having described the preferred embodiments, it will become apparent that various modifications can be made without departing from the scope of the invention as defined in the accompanying claims.

The invention claimed is:

1. A control lever calibration system, comprising:
   a control lever moveable in a work vehicle;
   a neutral switch activated by the control lever in a neutral position;
   an electronic sensor providing signals for the position of the control lever; and
   an electronic controller saving the position signals of the electronic sensor when the neutral switch is activated; mapping the position signals of the electronic sensor to traction drive motor commands for the work vehicle; and saving the position signals of the electronic sensor each time the position signal exceeds a previously stored position range.

2. The control lever calibration system of claim 1, wherein the control lever is moveable on a first axis between a maximum position on a first end and a second end of the position range, and on a second axis to the neutral position.

3. The control lever calibration system of claim 1, wherein the control lever is configured to receive steering commands and the steering commands control a speed of the traction drive motor.

4. The control lever calibration system of claim 2, wherein the first end of the position range is a forward traction drive motor speed and the second end of the position range is a reverse traction drive motor speed.

5. A control lever calibration system, comprising the steps of:
   translating a plurality of position signals from a sensor for a control lever to a plurality of traction drive motor commands for a work vehicle;
   determining if any of the plurality of position signals are within a stored range of position signals; and
   expanding the stored range for any of the plurality of position signals that are outside the stored range.

6. The control lever calibration system of claim 5, further comprising the steps of:
   detecting if the control lever actuates a neutral switch; and
   storing the position signals for the control lever each time the neutral switch is actuated.

7. The control lever calibration system of claim 6, wherein the stored range of control lever position signals are based on rotational speeds of the traction drive motor.

8. A control lever calibration system, comprising:
   an electronic sensor that provides a plurality of position signals of a control lever for a work vehicle;

a controller that maps each of the plurality of position signals to a traction drive motor command for the work vehicle, saves each of the plurality of position signals for the control lever when a neutral switch is activated by the control lever, and saves each of the plurality of position signals that indicates a control lever position that is outside a previously stored range.

9. The control lever calibration system of claim 8 wherein the work vehicle is a zero turn mower.

10. The control lever calibration system of claim 8 wherein the control lever is a steering lever pivotable between a forward position and a reverse position.

\* \* \* \* \*